US009079996B2

(12) United States Patent
Göbelt et al.

(10) Patent No.: US 9,079,996 B2
(45) Date of Patent: Jul. 14, 2015

(54) POLYMER MIXTURE COMPRISING A COMB COPOLYMER

(75) Inventors: Bernd Göbelt, Wesel (DE); Jürgen Omeis, Dorsten-Lembeck (DE)

(73) Assignee: BYK-Chemie GmbH, Wesel (DE)

( * ) Notice: Subject to any disclaimer, the term of this patent is extended or adjusted under 35 U.S.C. 154(b) by 532 days.

(21) Appl. No.: 12/521,210

(22) PCT Filed: Dec. 21, 2007

(86) PCT No.: PCT/EP2007/011330
§ 371 (c)(1),
(2), (4) Date: Jun. 25, 2009

(87) PCT Pub. No.: WO2008/080581
PCT Pub. Date: Jul. 10, 2008

(65) Prior Publication Data
US 2010/0029834 A1    Feb. 4, 2010

(30) Foreign Application Priority Data

Dec. 27, 2006   (DE) .......................... 10 2006 062 440

(51) Int. Cl.
| | |
|---|---|
| *C08F 257/02* | (2006.01) |
| *C08F 265/00* | (2006.01) |
| *C08F 265/04* | (2006.01) |
| *C08F 267/00* | (2006.01) |
| *C08F 287/00* | (2006.01) |
| *C08F 267/04* | (2006.01) |
| *C08F 283/06* | (2006.01) |
| *C08F 220/18* | (2006.01) |
| *C08F 222/06* | (2006.01) |
| *C08F 212/08* | (2006.01) |
| *C08F 212/32* | (2006.01) |
| *C08L 51/00* | (2006.01) |
| *C08L 53/00* | (2006.01) |
| *C08G 63/676* | (2006.01) |
| *C08F 8/48* | (2006.01) |
| *C08F 8/32* | (2006.01) |

(52) U.S. Cl.
CPC .............. *C08F 257/02* (2013.01); *C08F 8/32* (2013.01); *C08F 8/48* (2013.01); *C08F 265/00* (2013.01); *C08F 265/04* (2013.01); *C08F 267/00* (2013.01); *C08F 287/00* (2013.01); *C08G 63/676* (2013.01); *C08L 51/006* (2013.01); *C08L 53/00* (2013.01); *C08F 212/08* (2013.01); *C08F 212/32* (2013.01); *C08F 220/18* (2013.01); *C08F 222/06* (2013.01); *C08F 267/04* (2013.01); *C08F 283/06* (2013.01); *C08L 2666/02* (2013.01)

(58) Field of Classification Search
CPC .... C08F 257/02; C08F 265/00; C08F 265/04; C08F 267/00; C08F 287/00; C08F 8/32; C08F 267/04; C08F 283/06; C08F 220/18; C08F 222/06; C08F 212/08; C08F 212/32; C08F 8/48; C08L 51/006; C08L 53/00; C08L 2666/02; C08G 63/676
USPC ........................................................ 524/505
See application file for complete search history.

(56) References Cited

U.S. PATENT DOCUMENTS

| | | | |
|---|---|---|---|
| 5,612,396 A | | 3/1997 | Valenti et al. |
| 5,854,320 A | * | 12/1998 | Nakamura et al. .............. 524/48 |
| 6,107,409 A | | 8/2000 | Hogan et al. |
| 6,291,620 B1 | | 9/2001 | Moad et al. |
| 6,310,143 B1 | | 10/2001 | Vickers, Jr. et al. |
| 6,406,143 B1 | | 6/2002 | Chen et al. |
| 8,124,672 B2 | | 2/2012 | Reisacher et al. |
| 2005/0159555 A1 | * | 7/2005 | Shimanaka et al. .......... 525/276 |
| 2006/0000392 A1 | | 1/2006 | Reisacher et al. |
| 2006/0264535 A1 | * | 11/2006 | Oyanagi et al. ............... 523/160 |

FOREIGN PATENT DOCUMENTS

| | | | | |
|---|---|---|---|---|
| CN | 1711320 | A | 12/2005 | |
| DE | 199 49 593 | A1 | 4/2001 | |
| DE | 103 04 958 | A1 | 8/2004 | |
| DE | 103 43 904 | A1 | 4/2005 | |
| EP | 0 270 126 | A2 | 6/1988 | |
| EP | 0 945 501 | A1 | 9/1999 | |
| EP | 1 587 848 | B1 | 10/2005 | |
| JP | 60 123 514 | A | 7/1985 | |
| JP | 04 103 692 | A | 4/1992 | |
| WO | 98/01478 | A1 | 1/1998 | |
| WO | 98/58974 | A1 | 12/1998 | |
| WO | 2004/046251 | A | 6/2004 | |
| WO | 2004/046251 | A2 | 6/2004 | |
| WO | 2005/033151 | A1 | 4/2005 | |
| WO | WO 2007039603 | A2 * | 4/2007 | .............. C09B 67/00 |

OTHER PUBLICATIONS

Jeffamine M-2070 Polyetheramine Technical Bulletin.*
Buxbaum et al., "Industrial Inorganic Pigments", Wiley-VCH Verlag GmbH & Co KGaA, 3rd Edition, (2005).
Hawker et al., "New Polymer Synthesis by Nitrixide Mediated Living Radical Polymerizations", Chen. Rev. vol. 101, No. 12, pp. 3661-3688, (2001).
Herbst et al., "Industrielle Organische Pigmente" VCH Verlagsgesellschaft mbH, (1987).
Moad et al., "Living Radical Polymerization by the RAFT Process", Aust. J. Chem. vol. 58, p. 379-410, (2005).
Moad et at., "Living Free Radial Polymerization with Reversible Addition—Fragmentation Chain Transfer (the Life of RAFT)", Society of Chemical Industry, Polym Int., vol. 49, pg. 993-1001, (2000).

(Continued)

*Primary Examiner* — Angela C Scott
(74) *Attorney, Agent, or Firm* — Norris McLaughlin & Marcus PA

(57) ABSTRACT

The present invention relates to a polymer mixture consisting of at least one comb copolymer I containing blocks consisting of special structural units and at least one copolymerisate II comprising polymerised, optionally substituted styrene and maleic anhydride units, the carboxyl groups of which are present at least partially as alkali metal, earth alkali metal or ammonium salts, and also to the use of these polymer mixtures as wetting and dispersing agents.

16 Claims, No Drawings

(56) References Cited

OTHER PUBLICATIONS

Perrier et al., "Macromolecular Design via Reversible Addition-Fragmentation Chain Transfer (RAFT)/Xanthates (MADIX) Polymerization", Journal of Polymer Science, vol. 43, pp. 5347-5393, (2005).

"International Preliminary Report of Patentability" issued Jul. 9, 2009.

Taiwan Office Action Dated January 6, 2013.

* cited by examiner

POLYMER MIXTURE COMPRISING A COMB COPOLYMER

This is a 371 of PCT/EP2007/011330 filed 21 Dec. 2007 (international filing date).

The present invention relates to a polymer mixture consisting of at least one comb copolymer I containing blocks consisting of special structural units according to claim 1 and at least one copolymerisate II comprising polymerised, optionally substituted styrene and maleic anhydride units, the carboxyl groups of which are present at least partially as alkali metal, earth alkali metal or ammonium salts, and also to the use of these polymer mixtures as wetting and dispersing agents.

BACKGROUND OF THE INVENTION

It is known that a plurality of comb copolymers can be used as wetting and dispersing agents for solids, in particular pigments. Thus, comb copolymers are already known from the prior art that are obtained by converting styrene/maleic anhydride copolymers (SMA resins) as main chain with polyalkylene oxide amines and polyalkylene glycols as side chains.

For example, appropriately produced comb copolymers are described in U.S. Pat. No. 6,310,143 that besides imide structures have amide and ester linkages of the side chains with the main chain. Such comb copolymers do not assure a sufficiently high viscosity reduction as dispersing and wetting agents for some purposes of use, and as a result no adequately flowable pigment pastes can be formulated or no pigment pastes can be produced with a desired high pigment content.

Therefore, on the basis of this prior art there was a need to modify comb copolymers based on the known styrene-maleic anhydride copolymerisates so that by using them as wetting and dispersing agents solid pastes, preferably pigment pastes, with a very favourable flowability can be obtained in spite of the high solid content.

SUMMARY OF THE INVENTION

The object is achieved by making the polymer mixtures according to the invention available comprising I. at least one comb copolymer comprising
  a) at least one block of a copolymer comprising the following structural units I to IV, wherein $X_1$ stands for NH, and/or
  b) at least one block of a copolymer comprising the following structural units I, II and IV, wherein $X_1$ stands for O, and/or
  c) at least one block of a copolymer comprising the following structural units I to IV, wherein $X_1$ stands for NH or O, and/or
  d) at least one block of a copolymer comprising structural unit I and polymerised units of at least one ethylene unsaturated monomer, which is different from structural units II to IV,
    wherein block d) is only combined with one of the blocks a)-c) to form a block copolymer and wherein structural units I to IV stand for

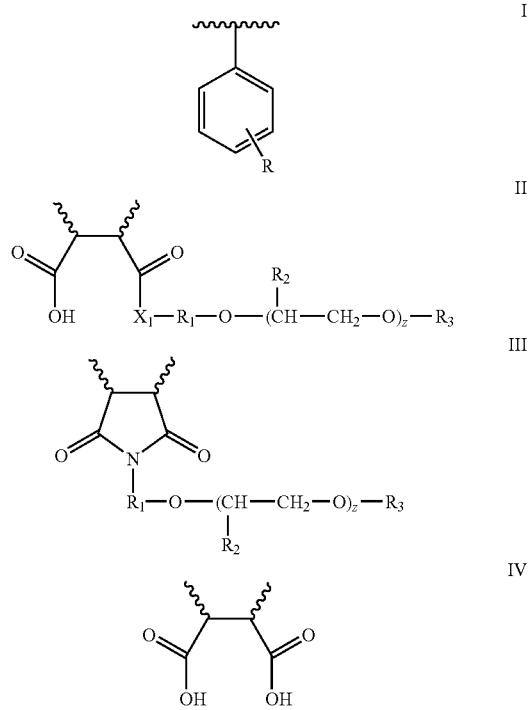

in which
〰〰 stands for the chain linkage,
R stands for H, halogen, preferably chlorine, a nitro group, an alkyl group with 1 to 15 C atoms or an aryl group with 6 to 18 C atoms,
$R_1$ stands for an alkylene group with 1 to 24 C atoms or a substituted or unsubstituted arylene group with 6 to 18 C atoms,
$R_2$ stands for H and/or an alkyl group,
z stands for a whole number from 3 to 70,
$X_1$ stands for NH and/or O,
$R_3$ stands for a optionally substituted alkyl group with 1 to 30 C atoms, which can be mono- or polyunsaturated, a optionally substituted aryl group with 6 to 18 C atoms, a optionally substituted cycloalkyl group with 4 to 10 C atoms,
and the free carboxyl groups of structural unit IV can be present in the form of alkali metal, earth alkali metal or ammonium salts,
and II. at least one copolymer based on structural unit I and structural unit IV, the carboxyl groups of which are present at least partially in the form of earth alkali metal, ammonium or alkali metal salts.

DETAILED DESCRIPTION

Preferably, in structural units I to IV
R=H
$R_1$=an alkylene group with 1 to 6 C atoms
$R_2$=H and/or $CH_3$, wherein the molar ratio of ethylene oxide units to propylene oxide units in structural unit II and structural unit III amounts to 0:100 to 100:0
$R_3$=an alkyl group with 1 to 8 C atoms or a optionally substituted aryl group with 6 C atoms
$X_1$=NH and/or O
Z=a whole number from 5 to 60.

It is particularly preferred if in structural units I to IV
R=H
$R_1$=an ethylene, propylene and/or isopropylene residue
$R_2$=H or a $CH_3$ residue, wherein the molar ratio of ethylene oxide units to propylene oxide units amounts to 70:30 to 30:70
$R_3$=a $CH_3$ or $C_2H_9$ residue
z=a whole number from 27 to 50, and
$R_1$ stands for NH and/or O.

The polymer mixture according to the invention preferably consists of at least one comb copolymer I and at least one copolymer II. The weight ratio of comb copolymer I to copolymer II preferably lies in the range of 50:50 to 95:5.

Comb copolymer I is obtainable, for example, by converting one optionally substituted styrene/maleic anhydride copolymerisate a1) with at least one polyalkylene oxide monoamine having a primary amino end group preferably at reaction temperatures of ≥150° C. and, if necessary, by further conversion at reaction temperatures of <100° C.

or a2) with a mixture of at least one polyalkylene oxide monoamine having a primary amino end group with at least one monohydroxy-terminated polyalkylene oxide preferably at a reaction temperature of ≥150° C. and, if necessary, by further conversion at a reaction temperature of <100° C.

or a3) with at least one monohydroxy-terminated polyalkylene oxide preferably in the presence of a usual esterification catalyst such as a sulphonic acid, for example, or by converting at least one copolymer with an AB block copolymer structure, the A block of which comprises optionally substituted styrene units and at least one copolymerised, ethylene unsaturated monomer selected from the group comprising (meth)acrylates and dialkyl maleinates, and the B block of which comprises optionally substituted styrene units and copolymerised maleic anhydride units, with a1), a2) or a3).

According to the invention, at least one comb copolymer I is mixed with the second mixture component, wherein copolymer II can be obtained from at least one SMA resin comprising optionally substituted styrene units and copolymerised maleic anhydride units by hydrolysis and salification thereof. In the case of copolymers II, the free carboxyl groups are present at least partially in the form of earth alkali metal, ammonium or alkali metal salts.

The SMA resins used in the production of comb copolymers I or copolymers II are optionally substituted styrene maleic anhydride copolymerisates, wherein the styrene can optionally be substituted with alkyl groups with 1 to 15 C atoms, preferably with methyl, with aryl groups with 6 to 18 C atoms, halogen, preferably chlorine, or at least one nitro group.

Therefore, according to the invention the "S" of the term SMA resin is understood to stand for both a substituted and an unsubstituted styrene.

SMA resins can have a statistical, alternating, gradient-type or block-type structure. They can be produced by radically initiated polymerisation processes, e.g. with azo -or peroxide initiators. In order to set the desired molecular weight, chain transfer agents such as e.g. thiols, secondary alcohols or alkyl halides such as carbon tetrachloride can be added during polymerisation. Further suitable production processes for SMA resins are controlled radical polymerisation processes such as e.g.:

the reversible addition fragmentation chain transfer process (RAFT), which when specific chain transfer agents are used is also called MADIX and addition fragmentation chain transfer, and is only referred to here as RAFT, as disclosed, for example, in Polym. Int. 2000, 49, 993; Aust. J. Chem. 2005, 58, 379; J. Polym. Sci. Part A: Polym. Chem. 2005, 43, 5347; U.S. Pat. No. 6,291,620, WO 98/01478, WO 98/58974 and WO 99131144, or controlled polymerisation with nitroxyl compounds as chain transfer agents (NMP), as disclosed, for example, in Chem. Rev. 2001, 101, 3661.

The C-RAFT process described in U.S. Pat. No. 6,291,620 is particularly preferred as polymerisation technology. The corresponding listed disclosures apply as part of the present disclosure.

The optionally substituted styrene maleic anhydride molar ratio of the SMA resins preferably lies at 1:1 to 8:1. An optionally substituted styrene maleic anhydride molar ratio of 1:1 to 2:1 is particularly preferred to obtain a high density of side chains. The number average molecular weight of the SMA resins used preferably lies between 1000 g/mol and 20 000 g/mol (determined by means of GPC).

$C_1$-$0_4$ monoalcohol initiated polyethers, which are formed from ethylene oxide and propylene oxide units and bear a primary amino group as end group, are preferably used as polyalkylene oxide monoamines for the production of the comb polymers I used according to the invention. The molar ratio of ethylene oxide to propylene oxide units should preferably lie between 0:100 and 100:0, particularly preferred between 30:70 and 70:30. The number average molecular weight of the polyalkylene oxide monoamines used preferably lies between 500 g/mol and 3000 g/mol (determined via amine value or $^1$H-NMR spectroscopy).

The monohydroxy-terminated polyethers used for conversion a2) or a3) are preferably polyalkylene oxides. The molar ratio of ethylene oxide to propylene oxide units of the monohydroxy-terminated polyethers preferably lies between 0:100 and 100:0, particularly preferred between 30:70 and 70:30. The number average molecular weight preferably lies between 200 g/mol and 3000 g/mol (measured by $^1$H-NMR spectroscopy).

An AB block copolymer, the A block of which is formed from optionally substituted styrene units and at least one copolymerised, ethylene unsaturated monomer selected from the group comprising (meth)acrylates and dialkyl maleinates, and the B block of which is formed from a combination of structural elements I, II and IV or a combination of structural elements I to IV, wherein $X_1$=O and/or NH, can also be used as comb copolymer I according to the invention.

Examples of aryl or alkyl (meth)acrylates are alkyl (meth)acrylates of straight-chain, branched or cycloaliphatic alcohols with 1 to 22 carbon atoms such as e.g. methyl (meth)acrylate, ethyl (meth)acrylate, n-butyl (meth)acrylate, i-butyl (meth)acrylate, t-butyl (meth)acrylate, lauryl (meth)acrylate, 2-ethylhexyl (meth)acrylate, stearyl (meth)acrylate, cyclohexyl (meth)acrylate, isobornyl (meth)acrylate and t-butyl (meth)acrylate; aryl (meth)acrylates such as benzyl methacrylate, or phenyl acrylate, wherein the aryl residues can respectively be unsubstituted or up to 4-substituted such as, for example, 4-nitrophenyl methacrylate.

The weight ratio of the A blocks to the B blocks preferably lies in the range of 95:5 to 5:95, particularly preferred from 90:10 to 10:90.

The maleic acid half-esters (structural element II) are preferably conversion products of maleic anhydride with monohydroxy-terminated polyethers, preferably monohydroxy-terminated polyalkylene oxides, such as already described above.

They can be used as such for polymerisation and/or be generated in situ during polymerisation by reacting the polymerising maleic anhydride with an abovementioned polyether and/or by converting the SMA resin with an abovementioned polyether after polymerisation.

In a preferred configuration, the comb copolymers I used according to the invention are preferably obtainable by firstly dissolving at least one SMA resin in a suitable solvent. For this, at least one polyalkylene oxide monoamine or a mixture of at least one polyalkylene oxide monoamine and at least one of the above-described monohydroxy-terminated polyethers or only at least one monohydroxy-terminated polyether is added and preferably converted at temperatures from 20° C. to 200° C., particularly preferred 30° C. to 170° C., especially preferred at temperatures of ≥150° C., to such an extent that at least 50% of the anhydride structures of the copolymerisate forming the respective main chain are preferably converted. In this case, the primary amino groups react with the anhydride structures of the copolymerisate to form amides and/or imides, wherein amide formation is encouraged at low reaction temperatures and imide formation is encouraged at increasing reaction temperature, or the hydroxyl group reacts with the anhydride structures to form half-esters. At reaction temperatures from 20° C. to 50° C. amide linkages are almost exclusively formed, whereas imide formation is favoured at temperatures above 140° C. Since water is released in the case of imide formation, further anhydride structures of the copolymerisates can be converted to carboxylic acid functions. In the case of each of these conversions the initially added solvent can be distilled off again to also remove the water produced by the imide formation, if necessary, by azeotropic distillation.

The use of a solvent during the conversion of the copolymerisate along with the amino component and/or the monohydroxy-terminated components ensures that all anhydride groups of the copolymerisates can react in a substantially equivalent manner from the beginning of the conversion. A more homogeneous product is obtained as a result of this.

According to the invention, a comb copolymer or a comb block copolymer is understood to mean a polymer, the copolymer or block copolymer of which is connected as base polymer or polymer main chain with linear polymer side chains via ester, amide and/or imide linkages.

The second mixture component of the polymer mixture according to the invention is an SMA resin. This SMA resin is preferably a statistical, alternating, gradient-type or block-type structure, wherein the molar ratio of the optionally substituted styrene to maleic anhydride lies at 1:1 to 8:1, preferably at 1:1 to 2:1. The anhydride groups of the SMA resin are preferably 100% hydrolysed and the free carboxyl groups are preferably 100% salified. The above-indicated polyalkylene oxide monoamines terminated with primary amino groups and optionally substituted monoamine compounds such as e.g. N,N-dimethylethanolamine, N,N-diethylethanolamine, N,N-dibutylethanolamine, methyldiethanolamine, ethyldiethanolamine or triethanolamine are used for salification.

Salification can also be achieved by adding suitable alkali metal salts or earth alkali metal salts.

The polymer mixtures according to the invention are suitable as wetting and dispersing agents for many water-based purposes of use known from the prior art. Thus, these can be used e.g. for producing or processing paints, printing inks, inks for inkjet processes such as for inkjet printers, coating, leather and textile dyes, pastes, pigment concentrates, ceramics, cosmetic preparations, and preferably always when solids such as pigments and/or fillers are present. For example, the polymer mixtures according to the invention can be used in the production of industrial paints, wood and furniture varnishes, vehicle paints, marine paints, anti-corrosion paints, can and coil coatings, artist and house paints, wherein optionally usual auxiliary substances such as known binders and/or solvents, pigments and optionally fillers, are added to the polymer mixtures according to the invention.

Examples of usual binders are resins based on polyurethanes, cellulose nitrates, cellulose acetobutyrates, alkyds, melamine, polyesters, chlorinated rubber, epoxides and acrylates.

The polymer mixtures according to the invention are also suitable as wetting and dispersing agents for the production of water-based coatings such as cathodic or anodic electrocoatings, e.g. for automotive bodywork. Further examples of use as dispersing agent are plasters, silicate paints, dispersion paints, water paints based on water-dilutable alkyds, alkyd emulsions, hybrid systems, 2-component systems, polyurethane and acrylate dispersions.

The polymer mixtures according to the invention are also suitable in particular for the production of solid concentrates, preferably of pigment concentrates. For this, these are present in a support medium such as in organic solvents, softeners and/or water and are added to dispersing solids while stirred. In addition, these concentrates can contain binders and/or other auxiliary substances. However, it is also advantageously possible to produce stable binder-free pigment concentrates with the polymer mixtures according to the invention. It is equally possible to produce flowable pigment concentrates from pigment press cake with the polymer mixtures according to the invention. In this case, a polymer mixture according to the invention is added to the press cake, which can still contain water, and the mixture thus obtained is dispersed. Such solid concentrates, preferably pigment concentrates, can then be worked into different substrates such as e.g. alkyd resins, polyester resins, acrylate resins, polyurethane resins or epoxy resins. Pigments that are directly dispersed solvent-free in the polymer mixtures according to the invention are particularly suitable for pigmenting thermoplastic and thermosetting plastic formulations.

The polymer mixtures according to the invention can also be advantageously used in the production of inks for "non-impact" printing processes such as thermal inkjet and bubble-jet processes. These inks can be aqueous ink formulations, for example.

The polymer mixtures according to the invention can also be used in the production of cosmetic preparations such as for the production of foundation, powders, lipsticks, hair dyes, creams, nail polishes and sun protection preparations. These can be present in the usual formulations such as in the form of W/O or O/W emulsions, solutions, gels, creams, lotions or sprays. In this case, the polymer mixtures according to the invention can already be used as dispersing agents in the dispersions used for the production of these preparations.

In addition, the invention also relates to the use of the polymer mixtures according to the invention as wetting and dispersing agents. These wetting and dispersing agents are preferably used for the above-described purposes of use.

A further purpose of use is also the production of a pigmented coating on a substrate, wherein the pigment paint is applied to the substrate and the applied pigment paint is burnt in or cured or cross-linked.

For the purposes of use of the polymer mixtures according to the invention, these can optionally be used with usual binder agents according to the prior art.

A use according to the invention lies, amongst other things, in the production of dispersible solids in powder particle and/or fibre particle form, in particular in the production of dispersible pigments, wherein the particles can be coated with a polymer mixture according to the invention. Such coatings of organic or inorganic solids are configured in a known way such as e.g. in EP-A-0 270 126. In this case, the solvent or emulsifier can either be removed or remain in mixture to form a paste. Such pastes are current commercial products that can optionally contain binders as well as further auxiliary substances and additives.

Especially in the case of pigments, the modification, i.e. coating, of the pigment surface can occur by adding the polymer mixtures according to the invention during or after the synthesis of the pigments, i.e. by adding them to the pigment suspension or during or after the pigment finish.

Pigments pretreated in this way are distinguished by their ability to be more readily worked in and by a higher colour intensity compared to pigments that have not been surface-treated.

The polymer mixtures according to the invention are suitable as wetting and dispersing agents for a plurality of pigments such as mono-, di-, tri- and polyazo pigments, oxazine, dioxazine, thiazine pigments, diketo-pyrrolo pyrroles, phthalocyanines, ultramarine and other metal complex pigments, indigoid pigments, diphenylmethane, triarylmethane, xanthene, acridine, quinacridone, methine pigments, anthraquinone, pyranthrone, perylene and other polycyclic carbonyl pigments. Further examples of the dispersible organic pigments according to the invention are to be found in the monograph: W. Herbst, K. Hunger "Industrial Organic Pigments", 1997 (publisher: Wiley-VCH, ISBN: 3-527-28836-8). Examples of dispersible inorganic pigments according to the invention are pigments based on carbon black, graphite, zinc, titanium dioxide, zinc oxide, zinc sulphide, zinc phosphate, barium sulphate, lithopone, iron oxide, ultramarine, manganese phosphate, cobalt aluminate, cobalt stannate, cobalt zincate, antimony oxide, antimony sulphide, chromium oxide, zinc chromate, mixed metal oxides based on nickel, bismuth, vanadium, molybdenum, cadmium, titanium, zinc, manganese, cobalt, iron, chromium, antimony, magnesium, aluminium (e.g. nickel-titanium yellow, bismuth-vanadate molybdate yellow or chromium titanium yellow). Further examples are specified in the monograph: G. Buxbaum "Industrial Inorganic Pigments", 1998 (publisher: Wiley-VCH, ISBN: 3-527-28878-3). Inorganic pigments can also be magnetic pigments based on pure iron, iron oxides and chromium oxides or mixed oxides, metallic effect pigments composed of aluminium, zinc, copper or brass as well as pearlescent pigments, fluorescent and phosphorescent luminescent pigments. Nanoscale, organic or inorganic solids with particle sizes below 100 nm such as certain carbon black types or particles, which are composed of a metal or semimetal oxide or hydroxide, as well as particles composed of mixed metal and/or semimetal oxides or hydroxides can also be dispersed by means of the polymer mixtures according to the invention. Suitable oxides for this are oxides and/or oxide hydroxides of aluminium, silicon, zinc, titanium that can be used for the production of such extremely fine-particle solids. The production of these oxide or hydroxide or oxide-hydroxide particles can be performed using various processes e.g. ion-exchange processes, plasma processes, sol-gel processes, precipitation, crushing (e.g. by milling) or flame hydrolysis etc. These nanoscale solids can also be so-called hybrid particles, which are formed from an inorganic core and an organic shell or vice versa.

According to the invention, dispersible, powder or fibrous fillers are, inter alia, those that are formed from powder or fibrous particles of aluminium oxide, aluminium hydroxide, silicon dioxide, diatomaceous earth, silica, quartz, silica gel, talc, kaolin, mica, perlite, feldspar, slate flour, calcium sulphate, barium sulphate, calcium carbonate, calcite, dolomite, glass or carbon. Further examples of dispersible pigments or fillers are also to be found in EP-A-0 270 126. Flatting agents such as e.g. silicic acids can also be excellently dispersed and stabilised with the polymer mixtures according to the invention.

Therefore, the present invention additionally relates to paints and pastes containing at least one polymer mixture according to the invention and at least one pigment, water and optionally an organic substrate and also binders and usual auxiliary substances, if necessary.

Therefore, the present invention additionally relates to the abovementioned pigments coated with at least one polymer mixture according to the invention.

EXAMPLES

Production of the Parent Compounds a) Polyether MSA Half-Ester 375 g of Pluriol A 750 E, 42 g of Polyglycol B01/20, 55 g of maleic anhydride are caused to react in the presence of 2 g of dodecylbenzol sulphonic acid for 3 h at 135° C.

b) Production of Comb Copolymer I 10.5 g of Pluriol P 600, 3.9 g of 2,4-diphenyl-4-methyl-1-pentene are heated to 160° C. Then, 8.7 g of styrene, 4.2 g of dibutyl maleate, 8.7 g of benzyl methyl acrylate and 0.2 g of Trigonox C are added over a period of 2 h. After a subsequent reaction time of 1 h, the temperature is reduced to 135° C. and 170 g of the polyether-MSA half-ester mixture obtained according to a) is added. 34 g of styrene and 1.7 g of Trigonox C are then added in doses over a period of 1 h. After a subsequent reaction time of 4 h the reaction mixture is cooled to room temperature.

c) Production of Comb Copolymer 2

20 g of SMA 2000 synthetic resin dissolved in 60 g of butyl acetate are caused to react with 116 g of Jeffamin M 2070 for 4 h at 160° C. The butyl acetate is distilled off during this.

Production of Wetting and Dispersing Agent 1
(Comparative Example)

100 g of comb copolymer 1 are emulsified in 100 g of water and adjusted to a pH of 9 with N,N-diethylaminoethanol. The mixture is then heated to 95° C. for 1 h and adjusted to a solid content of 40% by wt.

Production of Wetting and Dispersing Agent 2
(Mixture of the Invention)

5 g of SMA 2000 synthetic resin and 0.1 g of p-toluol sulphonic acid are emulsified in 100 g of water and caused to react for 8 h at 95° C. 100 g of comb copolymer 1 are then added and adjusted to a pH of 9 with N,N-diethylaminoethanol. A solid content of 40% by wt. is adjusted by adding water.

cl Production of Wetting and Dispersing Agent 3 (Comparative Example)

100 g of comb copolymer 2 are dissolved in 150 g of water.

Production of Wetting and Dispersing Agent 4
(Mixture of the Invention)

5 g of SMA 2000 synthetic resin and 0.1 g of p-toluol sulphonic acid are emulsified in 100 g of water and caused to react for 8 h at 95° C. 56 g of comb copolymer 2 are then added and for salification mixed with 18 g of Jeffamin M 2070. A solid content of 40% by wt. is adjusted by adding water.

Pluriol A 750 E polyethylene glycol monomethyl ether, hydroxyl number 75 g KOH/g, manufacturer BASF
Polyglycol B01/20 polypropylene glycol monobutyl ether, hydroxyl number 80 g KOH/g, manufacturer Clariant
Pluriol P 600 polypropylene glycol, hydroxyl number 195 g KOH/g, manufacturer BASF
Trigonox C tert-butyl peroxobenzoate, manufacturer Akzo Nobel
SMA 2000
synthetic resin styrene-maleic anhydride copolymer, manufacturer Cray Valley
Jeffamin M 2070 amine-terminated EO/PO polyether, manufacturer Huntsman Applications Examples:

I.

| Pigment concentration | % by wt. |
| --- | --- |
| Water | 27.00 |
| Wetting and dispersing agents 1-4 | 22.50 |
| BYK ®-017 | 0.5 |
| Hostaperm red violet ER02 | 30.00 |
| Water | 20.00 |
| | 100.00 |

Dispersion: 40 min at 40° C. and 10000 rpm, Dispermat CV
II.

| Paint Application | % by wt. |
| --- | --- |
| Pigment concentrate according to I. | 20.00 |
| Base coat Sikkens Autowave MM | 80.00 |
| | 100.00 |

Homogenisation: Shake for 5 min
BYK®-017 defoaming agent, manufacturer Byk Chemie GmbH
Base Coat Sikkens
Autowave MM unpigmented automotive repair base paint, water-based acrylate dispersion, manufacturer Akzo Nobel
Results:

| Wetting and dispersing agent | | | Paint Application | | |
| --- | --- | --- | --- | --- | --- |
| | Pigment concentration | | Trans-parency | Pin-holing | Gloss R20/R 60 |
| | Foam | Viscosity | | | |
| 1 | little | liquid limit | 2 | none | 24/63 |
| 2 | none | flowable | 2 | none | 26/64 |
| 3 | little | liquid limit | 3 | none | 20/53 |
| 4 | none | flowable | 3 | none | 26/70 |

Evaluation Scale:
1 good
2 satisfactory
3 not satisfactory

The gloss was determined using the "haze-gloss" measuring device from Byk Gardner. The transparency or pinholing was assessed visually. In this case, a scale of 1-5 was used (1=transparent; 5=non-transparent).

The invention claimed is:
1. A polymer mixture comprising
I. at least one comb copolymer comprising
   b) at least one block of a copolymer comprising the following structural units I, II and IV, wherein $X_1$ stands for O, and/or
   c) at least one block of a copolymer comprising the following structural units I to IV, wherein $X_1$ stands for O, and/or
   d) at least one block of a copolymer comprising structural unit I and polymerized units of at least one ethylene unsaturated monomer, which are different from structural units II to IV,
wherein when block d) is chosen it is combined with one of the blocks b) or c) to form a block copolymer, and
wherein structural units I to IV stand for

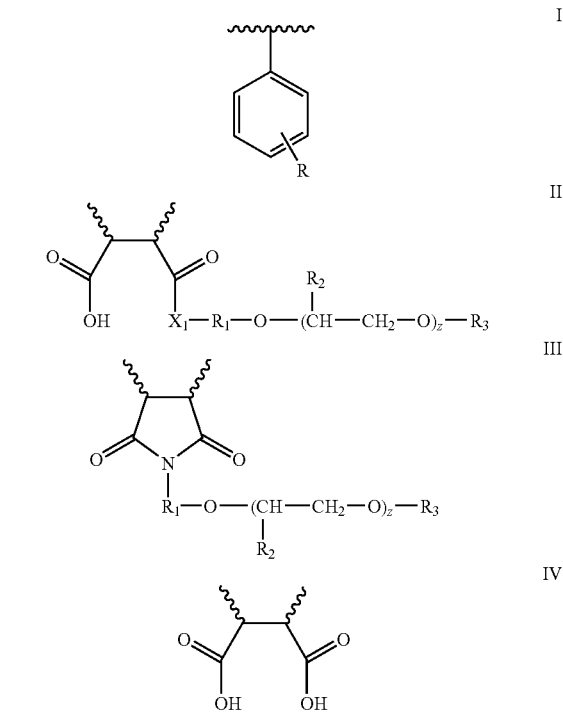

in which ⌇⌇⌇⌇ stands for the chain linkage,
R stands for H, halogen, a nitro group, an alkyl group with 1 to 15 C atoms or a aryl group with 6 to 18 C atoms,
$R_1$ stands for an alkylene group with 1 to 24 C atoms or a substituted or unsubstituted arylene group with 6 to 18 C atoms,
$R_2$ stands for H and/or an alkyl group,
z stands for a whole number from 5 to 70,
$X_1$ stands for O,
$R_3$ stands for an optionally substituted alkyl group with 1 to 30 C atoms, which is optionally mono- or polyunsaturated, an optionally substituted aryl group with 6 to 18 C atoms, or an optionally substituted cycloalkyl group with 4 to 10 C atoms,
and the free carboxyl groups of structural unit IV are optionally present in the form of alkali metal, earth alkali metal or ammonium salts, and II. at least one copolymer formed of structural unit I and structural unit IV, the carboxyl groups of which are present at least partially in the form of alkali metal, earth alkali metal or ammonium salts.

2. A polymer mixture according to claim 1, wherein in structural units I to IV
R =H
$R_1$ is an ethylene, propylene and/or isopropylene residue,
$R_2$ is H or a $CH_3$ residue,
  wherein the molar ratio of ethylene oxide units to propylene oxide units in structural unit II and structural unit III is from to 70:30 to 30:70,
$R_3$ is a $CH_3$ or $C_4H_9$ residue,
and
z is a whole number from 25 to 50.

3. A polymer mixture according to claim 1, wherein the ethylene-unsaturated monomer is at least one monomer selected from the group consisting of (methyl)acrylic acid derivatives, aryl (meth)acrylates and maleic acid diesters.

4. The polymer mixture of claim 3, wherein said ethylene-unsaturated monomer is selected from the group consisting of dialkyl maleinates.

5. A polymer mixture according to claim 1, obtained by mixing the comb copolymer I with copolymer II.

6. A polymer mixture according to claim 1, wherein in structural units I to IV
R is H
$R_1$ is an alkylene group with 1 to 6 C atoms
  wherein the molar ratio of ethylene oxide units to propylene oxide units in structural unit II and structural unit III is from 0:100 to 100:0,
$R_3$ is an alkyl group with 1 to 8 C atoms or an optionally substituted aryl group with 6 C atoms
$X_1$ is O
and
z is a whole number from 5 to 60.

7. A polymer mixture according to claim 1, wherein the weight ratio of comb copolymer I to copolymer II is in the range of 50:50 to 95:5.

8. A polymer mixture according to claim 1, wherein the copolymer II is obtained from optionally substituted styrene and maleic anhydride units by hydrolysis of the anhydride groups and salification.

9. A polymer mixture according to claim 8, wherein the salification occurs with at least one compound having an amino group.

10. A wetting and dispersing agent, comprising the polymer mixture of claim 1.

11. A composition comprising pigments and/or fillers and the wetting and dispersing agent of claim 10.

12. The composition of claim 11, wherein said composition is a pigment concentrate or paste.

13. The composition of claim 12, wherein said pigment concentrate or paste is selected from the group consisting of paints, printing inks, inks for inkjet processes, coating, leather and/or textile dyes, ceramics and cosmetic preparations.

14. The composition of claim 13, further comprising a binder.

15. Paints or pastes containing a polymer mixture according to claim 1 as wetting and dispersing agent, at least one pigment, optionally an aqueous medium and optionally at least one binder.

16. A pigment, the surface of which is modified with a polymer mixture according to claim 1.

* * * * *